United States Patent
Shin et al.

(10) Patent No.: US 10,657,400 B2
(45) Date of Patent: *May 19, 2020

(54) METHOD AND APPARATUS WITH VEIN PATTERN AUTHENTICATION

(71) Applicant: SAMSUNG ELECTRONICS CO., LTD., Suwon-si (KR)

(72) Inventors: Jungsoon Shin, Yongin-si (KR); Namjoon Kim, Anyang-si (KR); Joonah Park, Seoul (KR); Soochul Lim, Seoul (KR); Jaehyuk Choi, Seoul (KR); Tae-Sung Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,609

(22) Filed: Apr. 29, 2019

(65) Prior Publication Data

US 2019/0258881 A1 Aug. 22, 2019

Related U.S. Application Data

(63) Continuation of application No. 14/725,460, filed on May 29, 2015, now Pat. No. 10,318,832.

(30) Foreign Application Priority Data

Oct. 23, 2014 (KR) ........................ 10-2014-0144117

(51) Int. Cl.
*G06K 9/00* (2006.01)
*G06F 21/32* (2013.01)

(52) U.S. Cl.
CPC ......... *G06K 9/00885* (2013.01); *G06F 21/32* (2013.01); *G06K 2009/00932* (2013.01); *G06K 2009/00939* (2013.01)

(58) Field of Classification Search
None
See application file for complete search history.

(56) References Cited

U.S. PATENT DOCUMENTS 5,508,759 A * 4/1996 Konishi ................. A61B 3/113
351/205
8,019,126 B2 9/2011 Amano
(Continued)

FOREIGN PATENT DOCUMENTS

JP 2002-312324 A 10/2002
JP 4900578 B2 3/2012
(Continued)

*Primary Examiner* — Chan S Park
*Assistant Examiner* — Elisa M Rice
(74) *Attorney, Agent, or Firm* — NSIP Law

(57) ABSTRACT

An authentication method includes projecting a near infrared (NIR) ray using a light emitting diode (LED) of a terminal, receiving a light reflected by a vein of a user using an image sensor of the terminal, verifying whether an image generated using the received light exhibits a vein pattern, in response to the image generated using the received light being verified as exhibiting the vein pattern, generating a vein pattern of the vein based on an image generated using the received light, and in response to the generated vein pattern being determined to match a pre-stored vein pattern, authenticating the user as a registered user corresponding to the pre-stored vein pattern.

24 Claims, 17 Drawing Sheets

(56) References Cited

U.S. PATENT DOCUMENTS

| | | | |
|---|---|---|---|
| 8,300,897 B2 | 10/2012 | Nagasaka et al. | |
| 8,335,353 B2 | 12/2012 | Yamamoto et al. | |
| 8,384,885 B2 | 2/2013 | Kono et al. | |
| 8,477,012 B2 | 7/2013 | Kato | |
| 8,565,497 B2 | 10/2013 | Nada et al. | |
| 8,588,478 B2 | 11/2013 | Makimoto et al. | |
| 8,607,064 B2 | 12/2013 | Uneda et al. | |
| 8,649,568 B2 | 2/2014 | Sato | |
| 8,666,121 B2 | 3/2014 | Muquit et al. | |
| 8,692,875 B2 | 4/2014 | Watanabe | |
| 8,768,049 B2 | 7/2014 | Wang et al. | |
| 8,787,624 B2 | 7/2014 | Hama et al. | |
| 9,621,562 B2 | 4/2017 | Furuichi et al. | |
| 9,646,147 B2* | 5/2017 | Lam | G06F 21/32 |
| 2002/0061748 A1 | 5/2002 | Nakakita et al. | |
| 2004/0022421 A1 | 2/2004 | Endoh et al. | |
| 2005/0180620 A1 | 8/2005 | Takiguchi | |
| 2007/0223792 A1 | 9/2007 | Morimoto et al. | |
| 2008/0216171 A1 | 9/2008 | Sano et al. | |
| 2008/0273762 A1* | 11/2008 | Kato | G06K 9/00 382/115 |
| 2009/0080710 A1* | 3/2009 | Abe | G07C 9/00087 382/115 |
| 2009/0115617 A1* | 5/2009 | Sano | G06Q 30/02 340/573.1 |
| 2009/0185241 A1 | 7/2009 | Nepomniachtchi | |
| 2010/0061598 A1 | 3/2010 | Seo | |
| 2011/0063077 A1 | 3/2011 | Jung et al. | |
| 2012/0046077 A1* | 2/2012 | Kim | H04M 1/72577 455/566 |
| 2012/0271172 A1 | 10/2012 | Komuro | |
| 2014/0196131 A1* | 7/2014 | Lee | G06F 21/35 726/7 |
| 2014/0201827 A1* | 7/2014 | Okazaki | G06F 1/1616 726/7 |
| 2014/0221848 A1 | 8/2014 | Nagasaka | |
| 2015/0381609 A1* | 12/2015 | Dadu | H04L 63/0861 726/9 |

FOREIGN PATENT DOCUMENTS

| | | |
|---|---|---|
| JP | 4953235 B2 | 6/2012 |
| JP | 5268293 B2 | 8/2013 |
| JP | 2013-212315 A | 10/2013 |
| JP | 2014-124453 A | 7/2014 |
| KR | 10-2010-0091592 A | 8/2010 |
| KR | 10-1067198 B1 | 9/2011 |

* cited by examiner

METHOD AND APPARATUS WITH VEIN PATTERN AUTHENTICATION

CROSS-REFERENCE TO RELATED APPLICATIONS

This application is a continuation of application Ser. No. 14/725,460 filed on May. 29, 2015, now U.S. Pat. No. 10,318,832, issued on Jun. 11, 2019, which claims the benefit under 35 USC 119(a) of Korean patent Application No. 10-2014-0144117 filed on Oct. 23, 2014, in the Korean Intellectual Property Office, the entire disclosures of which are incorporated herein by reference for all purposes.

BACKGROUND

1. Field

The following description relates to a method and apparatus with authentication technology for a user of a terminal. The following description also relates to a method and apparatus with vein pattern authentication for a user of a terminal.

2. Description of Related Art

Research on various security methods of protecting personal information is ongoing. To authenticate a user, a method of inputting a preset identification (ID) and a preset password by the user may be used. However, such a knowledge-based authentication may be vulnerable to information exposure, in that the ID and password may be acquired by a malicious user and used to permit unauthorized access to that malicious user. Thus, a method of authenticating a user using biometric data of the user may be used, rather than the knowledge-based authentication that uses an ID and password to authenticate the user. The biometric data may include, for example, a fingerprint pattern, an iris pattern, and a vein pattern.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a terminal authentication method includes projecting a near infrared (NIR) ray using a light emitting diode (LED) of a terminal, receiving a light reflected by a vein of a user using an image sensor of the terminal, verifying whether an image generated using the received light exhibits a vein pattern, in response to the image generated using the received light being verified as exhibiting the vein pattern, generating a vein pattern of the vein based on an image generated using the received light, and in response to the generated vein pattern being determined to match a pre-stored vein pattern, authenticating the user as a registered user corresponding to the pre-stored vein pattern.

The terminal may be a wearable device.

The terminal may be worn on a hand of the user, and the vein of the use may be a vein of at least a portion of the hand of the user.

The method may further include in response to the user being authenticated as the registered user, unlocking the terminal.

The method may further include in response to an output of the LED being determined to be lower than a preset output, controlling the projecting of the NIR ray by increasing an integration time of the image sensor.

The method may further include generating the pre-stored vein pattern in a registering the registered user at the terminal.

The registering may include projecting the NIR ray toward a vein of the registered user adjacent to the terminal using the LED, receiving a light reflected by the vein of the registered user using the image sensor, generating a vein pattern of the vein of the registered user based on the image generated using the received light, and registering the registered user at the terminal by storing the vein pattern.

In another general aspect, a terminal authentication method includes verifying that a vein of a user is positioned less than a preset distance from a terminal, in response to the verifying, switching an operating mode of the terminal to an authentication mode, in response to the operating mode being switched to the authentication mode, increasing a currently provided output of a light emitting diode (LED) of the terminal, projecting a near infrared (NIR) ray, using the LED, onto the vein, receiving a light reflected by the vein using an image sensor of the terminal, generating a vein pattern of the vein based on an image generated using the received light, and in response to the generated vein pattern matching a pre-stored vein pattern, authenticating the user as a registered user corresponding to the pre-stored vein pattern.

The verifying that the vein is positioned less than the preset distance from the terminal may be performed using the LED and the image sensor at the currently provided output of the LED.

The terminal may be a wearable device.

The verifying that the vein is positioned less than the preset distance from the terminal may occur in response to a determination that a body part is within the preset distance from the terminal.

The method may further include in response to the user being authenticated as the registered user, unlocking the terminal.

The method may further include in response to an output of the LED being determined to be lower than a preset output, controlling the projecting of the NIR ray by increasing an integration time of the image sensor.

The method may further include generating the pre-stored vein pattern in a registering of the registered user at the terminal.

The registering may include projecting an NIR ray toward a vein of the registered user adjacent to the terminal using the LED, receiving a light reflected by the vein of the registered user using the image sensor, generating a vein pattern of the vein of the registered user based on an image generated using the received light, and registering the registered user at the terminal by storing the vein pattern.

In another general aspect, a terminal authentication method of authenticating a user using a vein pattern includes verifying that a terminal is being worn by the user, wherein the terminal is a wearable device, in response to the verifying that the terminal is being worn by the user, projecting a near infrared (NIR) ray using a light emitting diode (LED) of the terminal, receiving a light reflected by a vein of the user using an image sensor of the terminal, generating a vein pattern of the vein based on an image generated using the received light, and in response to the generated vein pattern matching a pre-stored vein pattern, authenticating the user as a registered user corresponding to the pre-stored vein pattern.

The verifying that a terminal is being worn by the user may be performed using the LED and the image sensor.

The method may further include, in response to the verifying that a terminal is being worn by the user, increasing an output of the LED.

The method may further include verifying that the terminal is removed from the user, and in response to the terminal being removed, switching an operating mode of the terminal to a locking mode.

In another general aspect, a terminal comprises a light emitting diode (LED) of a terminal configured to project a near infrared (NIR) ray, an image sensor of the terminal configured to receive a light reflected by a vein of the user, and one or more processors configured to verify whether an image generated using the received light exhibits a vein pattern, in response to the image generated using the received light exhibiting a vein pattern, generate a vein pattern of the vein based on an image generated using the received light, and in response to the generated vein pattern matching a pre-stored vein pattern, authenticate the user as a registered user corresponding to the pre-stored vein pattern.

Other features and aspects will be apparent from the following detailed description, the drawings, and the claims.

Figure 1:
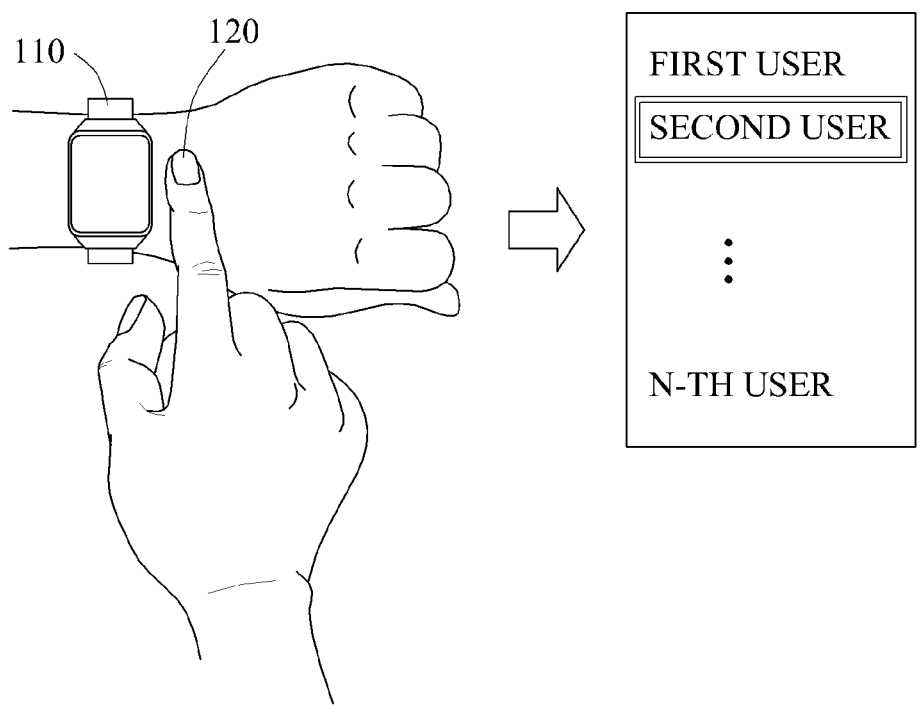
FIG. 1 illustrates an example of a user being authenticated using a vein pattern.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent after an understanding of the disclosure of this application. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are known in the art, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Examples exist with various alterations and modifications having been optionally made to examples. Here, the examples are not construed as limited to the disclosure and are intended to be understood to include all changes, equivalents, and replacements within the idea and the technical scope of the disclosure and related concepts.

The terminology used herein is for the purpose of describing particular examples only and is not to be limiting of the examples. As used herein, the singular forms "a", "an", and "the" are intended to include the plural forms as well, unless the context clearly indicates otherwise. It is intended to be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong in view of the disclosure of this application. It is intended to be further understood that terms, such as those defined in commonly-used dictionaries, are intended to be interpreted as having a meaning that is consistent with their meaning in the context of the relevant art and the disclosure of this application and are not intended to be interpreted in an idealized or overly formal sense unless expressly so defined herein.

When describing the examples with reference to the accompanying drawings, like reference numerals refer to like constituent elements and a repeated description related thereto is omitted for brevity. When it is determined detailed description related to a related known function or configuration causes the purpose of the examples unnecessarily ambiguous in describing the examples, the detailed description is omitted for clarity. Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

FIG. 1 illustrates an example of a user being authenticated using a vein pattern.

Referring to the example of FIG. 1, a vein pattern authentication system 100 includes a terminal, and a skin 120 of a user. Hereinafter, the terminal is referred to as a portable terminal 110. Although the terminal is described in an example that operates using the portable terminal 110, a scope of the terminal is not limited to the portable terminal 110. That is, the terminal may be a non-portable terminal. With respect to the terminal, examples of a portable terminal are a smartwatch or smartphone, while an example of non-portable terminal is a desktop computer with an attached monitor and other peripherals.

A blood vessel of a human has a transmittance that differs from that of other tissue, such as skin or muscle, with respect to a wavelength of an infrared (IR) ray incident upon such tissue. Thus, when an IR ray is projected toward a skin surface of a human user, such as a human user's wrist, a light reflected by the skin of the user is able to be received and measured. Based on the measurements, a blood vessel is distinguished from other tissues based on the characteristics of measured, received light. In an example, the blood vessel is a vein.

In an example, an IR ray used to generate a vein pattern is a near infrared (NIR) ray.

The portable terminal 110 generates a vein pattern of the skin 120 of the user. The portable terminal 110 authenticates a user corresponding to the generated vein pattern, from among a plurality of registered users.

According to an example, by authenticating a user using a vein pattern, a security of the portable terminal 110 may be enhanced. Additionally, by authenticating a user using a vein pattern, a security of a device interoperating or otherwise communicating with the portable terminal 110 may also be enhanced.

Subsequently, examples of vein pattern authentication apparatuses and methods are described in further detail with reference to FIGS. 2 through 17.

Figure 2:
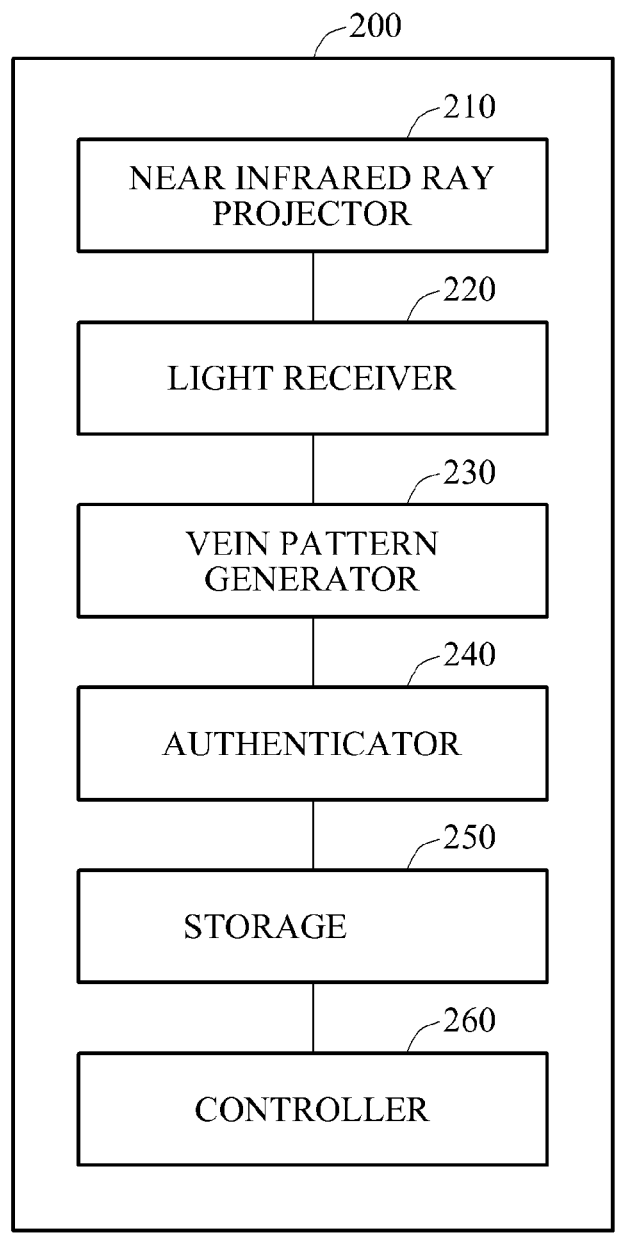
FIG. 2 is a block diagram illustrating an example of a portable terminal configured to perform a vein pattern authentication.

FIG. 2 is a block diagram illustrating an example of a portable terminal 200 configured to perform a vein pattern authentication.

In the example of FIG. 2, the portable terminal 200 is the portable terminal 110 of FIG. 1, as described in further detail, above.

According to an example, the portable terminal 200 may be one of a smartphone, a laptop computer, and a tablet personal computer (PC). However, these are only examples, and other computing devices are used as the portable terminal 200 in other examples.

According to an example, the portable terminal 200 is a wearable device. For example, in such an example the wearable device may be one of a watch type device, a ring type device, a bracelet type device, a necklace type device, and a glasses type device. However, these are only examples, and other wearable computing devices may be used as the portable terminal 200 in other examples.

Referring to the example of FIG. 2, the portable terminal 200 may include an NIR ray projector 210, a light receiver 220, a vein pattern generator 230, an authenticator 240, a storage 250, and a controller 260. However, other relevant components may be used in addition to or in lieu of these example components in other examples.

In the example of FIG. 2, the controller 260 may control the NIR ray projector 210, the light receiver 220, the vein pattern generator 230, the authenticator 240, and the storage 250.

In such an example, the NIR ray projector 210, the light receiver 220, the vein pattern generator 230, the authenticator 240, the storage 250, and the controller 260 are described in further detail with reference to FIGS. 3 through 17, as discussed further below.

Figure 3:
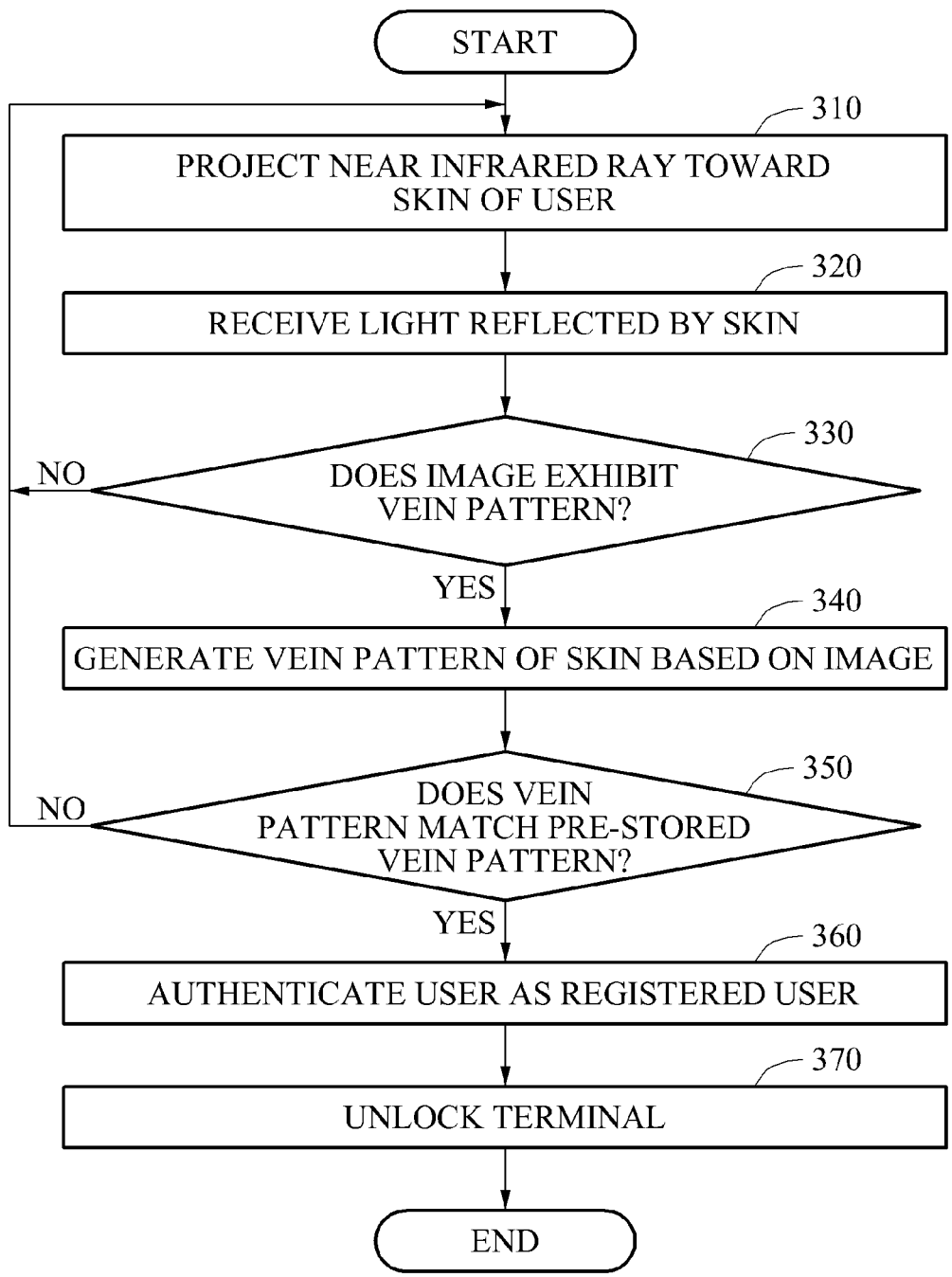
FIG. 3 is a flowchart illustrating an example of a vein pattern authentication method.

FIG. 3 is a flowchart illustrating an example of a vein pattern authentication method. The vein pattern authentication method of FIG. 3 is performed by the portable terminal 200 of FIG. 2.

Referring to FIG. 3, in operation 310, the method may project a near infrared ray toward the skin of a user. For example, the NIR ray projector 210 may project an NIR ray toward a skin, of a user of the portable terminal 200, adjacent to the portable terminal 200 using a light emitting diode (LED). Also, in an example, the LED is an NIR LED configured to emit an NIR ray. As discussed, such an NIR ray can be used to identify vein patterns for particular users.

In operation 320, the method may receive light reflected by the skin of the user. For example, the light receiver 220 may receive a light reflected by the skin using an image sensor.

For example, in various examples, the image sensor may include one of a complementary metal-oxide semiconductor (CMOS) image sensor (CIS), a charge coupled device (CCD), a laser speckle sensor, and a sensor using indium-gallium-sulfur (InGaS). Such image sensors receive and measure the light, such as NIR light, that is produced by the LED and reflected by the skin of the user.

According to an example, the image sensor may be an array sensor.

According to another example, the image sensor may have pixels particularly designed to respond to an NIR ray reflected by a skin tissue or a blood vessel.

According to still another example, the image sensor may include an IR band pass optical filter on a surface of the sensor or above the pixels, where the filter may be configured to allow only a band of an NIR ray to pass. Such an optical filter acts to block other bands of light.

The light receiver 220 may increase an integration time so as to be greater than a preset time, at which an output of the LED is determined to be relatively low.

The light receiver 220 may generate an image using the received light.

Because a transmittance of a vein with respect to an NIR ray differs from a transmittance of a peripheral tissue that is not a vein, as discussed further above, the vein of the skin may be exhibited in the image, because the image provides visual information that differentiates between a vein and other tissue.

In operation 330, the method may verify whether the image exhibits a vein pattern. For example, the vein pattern generator 230 may verify whether the image exhibits a vein pattern.

For example, the vein pattern generator 230 may verify whether the image exhibits a vein pattern based on stored data. Such stored data may include records that represent reference vein patterns that help identify past users. An algorithm that verifies whether an image exhibits a vein pattern may be trained as the user feeds back information regarding a corresponding result.

When the image exhibits a vein pattern, operation 340 may be performed. In operation 340, the method generates a vein pattern of the skin based on the image generated using the received light. For example, the vein pattern generator 230 may generate a vein pattern of the skin based on the image generated using the received light. Thus, the illustrated vein pattern generator 230 is representative of hardware or hardware in combination with instructions, such as an example where the vein pattern generator 230 includes one or more processors, and an example where the vein pattern generator 230 includes such one or more processors and instructions stored in the storage or another memory, which when executed by the one or more processors configures the one or more processors to perform any, any combination, or all operations of the discussed vein pattern generator 230, for example. In addition, herein any one or any combination of two or more of the processors of the vein pattern generator 230, the authenticator 240, and the controller 260 may be implemented by a same one or more processors, as well as examples where such same one or more processors are configured through execution of corresponding instructions stored in the storage, or another storage.

In operation 350, the method may verify whether the generated vein pattern matches a pre-stored vein pattern. For example, the authenticator 240 may verify whether the generated vein pattern matches a pre-stored vein pattern. The illustrated authenticator 240 is representative of hardware or hardware in combination with instructions, such as an example where the authenticator 240 includes one or more processors, and an example where the authenticator 240 includes such one or more processors and instructions stored in the storage or another memory, which when executed by the one or more processors configures the one or more processors to perform any, any combination, or all operations of the discussed authenticator 240, for example.

According to an example, the storage 250 stores a plurality of vein patterns. The plurality of vein patterns are respective vein patterns of a plurality of registered users.

For example, the authenticator 240 may verify whether the generated vein pattern matches one of the plurality of pre-stored vein patterns.

In operation 360, the method may authenticate the user as a registered user of the pre-stored vein pattern when the generated vein pattern matches the pre-stored vein pattern. For example, the authenticator 240 may authenticate the user as a registered user of the pre-stored vein pattern when the generated vein pattern matches the pre-stored vein pattern.

According to an example, the authenticator 240 authenticates the user as the registered user of the pre-stored vein pattern when the generated vein pattern matches one of the plurality of pre-stored vein patterns.

In operation 370, the method may unlock the portable terminal 200 when the user is authenticated as the registered user. For example, the controller 260 may unlock the portable terminal 200 when the user is authenticated as the registered user. Thus, the illustrated controller 260 is representative of hardware or hardware in combination with instructions, such as an example where the controller 260 includes one or more processors, and an example where the controller 260 includes such one or more processors and instructions stored in the storage or another memory, which when executed by the one or more processors configures the one or more processors to perform any, any combination, or all operations of the discussed controller 260, for example.

For example, the controller 260 may provide a menu set for the user to the portable terminal 200 when the user has been authenticated as one of the plurality of registered users.

Figure 4:
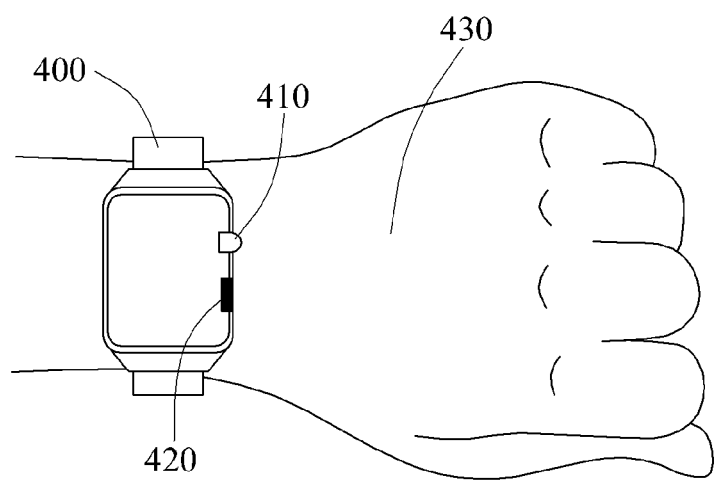
FIG. 4 illustrates an example of a method of projecting a near infrared (NIR) ray toward a skin of a user.

FIG. 4 illustrates an example of a method of projecting an NIR ray toward a skin of a user.

Referring to the example of FIG. 4, a portable terminal 400 may include an NIR ray projector 410, and a light receiver 420. In the example of FIG. 4, the portable terminal 400, the NIR ray projector 410, and the light receiver 420 may correspond to the portable terminal 200, the NIR ray projector 210, and the light receiver 220 of FIG. 2, respectively. Thus, the corresponding previously presented descriptions of these elements may also apply to these elements.

According to an example, a skin of a user may correspond to a back 430 of a hand of the user.

The NIR ray projector 410 may project an NIR ray toward the back 430 of the hand of the user.

The light receiver 420 may receive a light reflected by the back 430 of the hand of the user.

Figure 5:
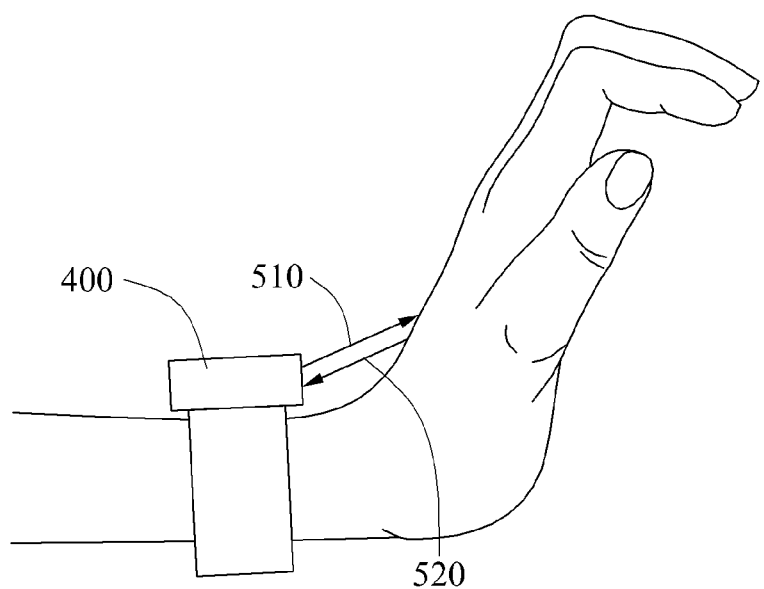
FIG. 5 illustrates an example of a method of projecting an NIR ray toward a skin of a user.

An example of projecting an NIR ray toward the back 430 of the hand of the user is further illustrated in the example of FIG. 5.

FIG. 5 illustrates an example of a method of projecting an NIR ray toward a skin of a user.

Referring to the example of FIG. 5, the user disposes the back 430 of the hand on which the portable terminal 400 is worn within an angle of view of an LED of the NIR ray projector 410.

Hence, the NIR ray projector 410 projects an NIR ray 510 toward the back 430 of the hand.

Thus, the light receiver 420 receives a light 520 reflected by the back 430 of the hand.

Figure 6:
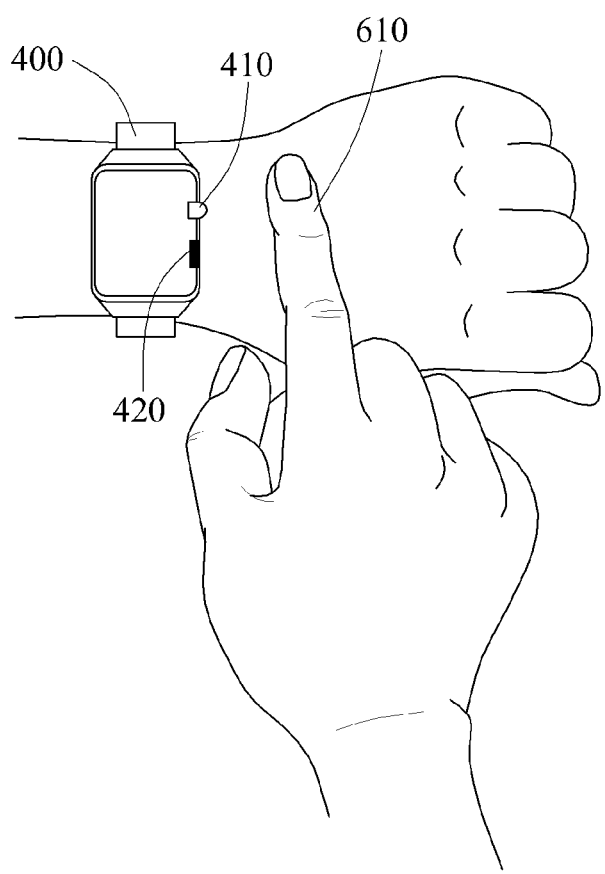
FIG. 6 illustrates an example of a method of projecting an NIR ray toward a skin of a user.

FIG. 6 illustrates an example of a method of projecting an NIR ray toward a skin of a user.

Referring to the example of FIG. 6, the user disposes at least one finger 610, e.g., of a hand other than the hand on which the portable terminal 400 is worn, within the angle of view of the LED of the NIR ray projector 410.

In such an example, the NIR ray projector 410 projects an NIR ray toward the at least one finger 610.

Thus, the light receiver 420 may receive a light reflected by the at least one finger 610.

Figure 7:
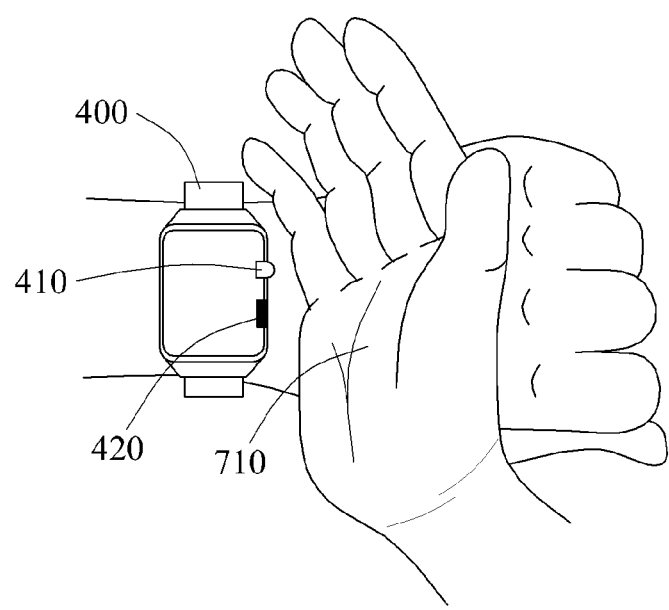
FIG. 7 illustrates an example of a method of projecting an NIR ray toward a skin of a user.

FIG. 7 illustrates an example of a method of projecting an NIR ray toward a skin of a user.

Referring to the example of FIG. 7, the user disposes a palm 710 of a hand e.g., other than the hand on which the portable terminal 400 is worn, within the angle of view of the LED of the NIR ray projector 410.

In this example, the NIR ray projector 410 projects an NIR ray toward the palm 710.

Thus, the light receiver 420 receives a light reflected by the palm 710.

Figure 8:
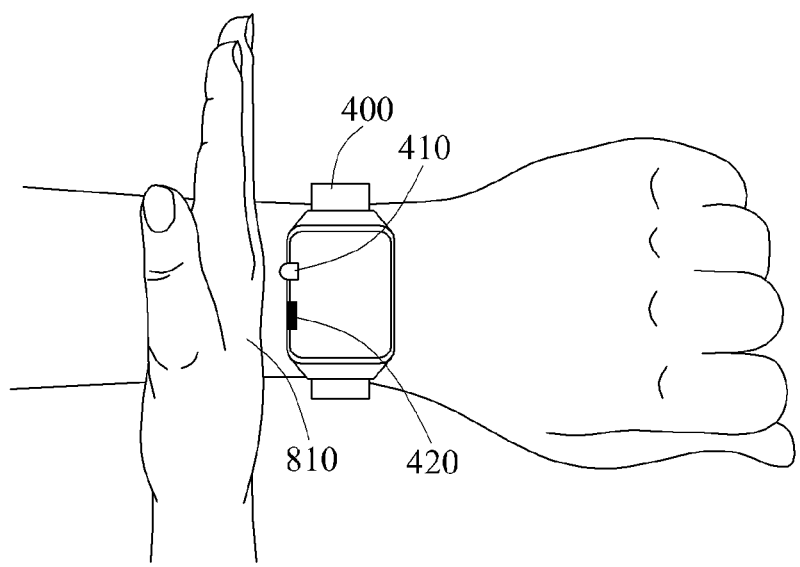
FIG. 8 illustrates an example of a method of projecting an NIR ray toward a skin of a user.

FIG. 8 illustrates an example of a method of projecting an NIR ray toward a skin of a user.

Referring to the example of FIG. 8, the user disposes a back 810 of a hand other than the hand on which the portable terminal 400 is worn, within the angle of view of the LED of the NIR ray projector 410.

In this example, the NIR ray projector 410 projects an NIR ray toward the back 810 e.g., of the other hand.

The light receiver 420 receives a light reflected by the back 810 of the other hand.

According to such an example, the portable terminal 400 may change positions of the NIR ray projector 410 and/or the light receiver 420 by deforming a body part of the portable terminal 400. For example, the user may change the positions of the NIR ray projector 410 and/or the light receiver 420 by rotating the body part of the portable terminal 400. Such adjustment helps ensure that the NIR ray is emitted and received in an appropriate direction.

FIGS. 4 through 8 illustrate various examples of the NIR ray projector 410 and the light receiver 420 that are positioned on a side surface of the portable terminal 400. However, according to an example, the NIR ray projector 410 and the light receiver 420 may alternatively be positioned on a front surface of the portable terminal 400.

Figure 9:
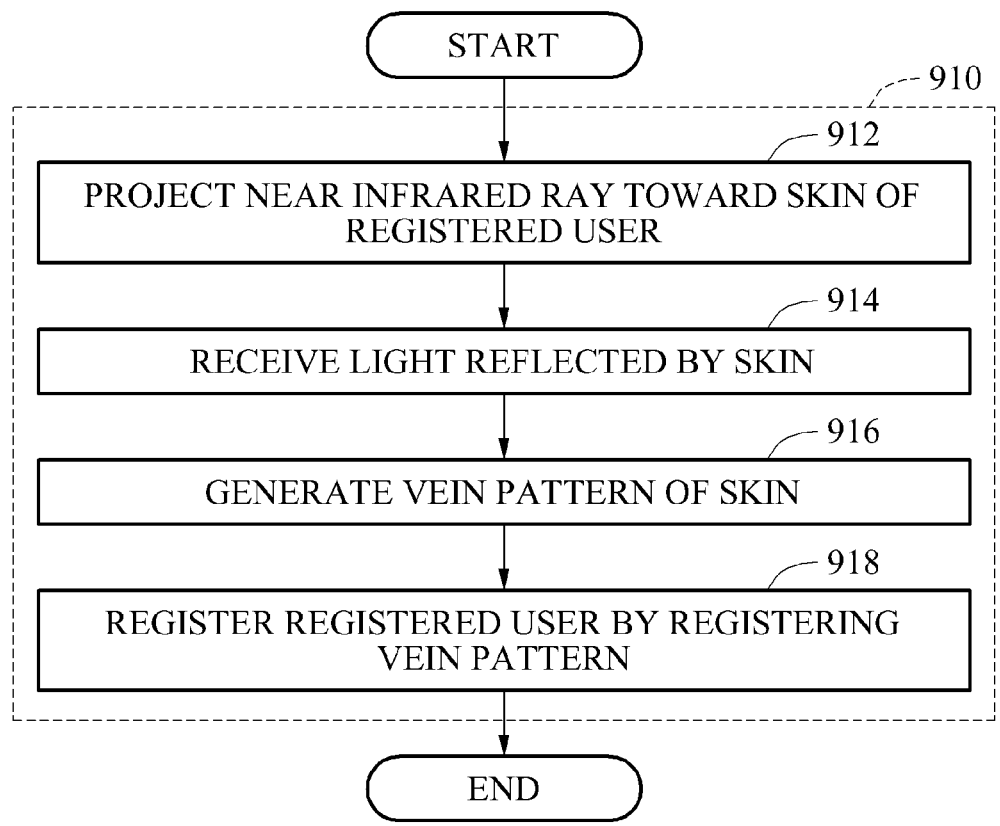
FIG. 9 is a flowchart illustrating an example of a method of registering a user.

FIG. 9 is a flowchart illustrating an example of a method of registering a user.

In the method of FIG. 9, operation 910 may be performed before operation 310 of the method of FIG. 3 is performed, but examples are not limited to this specific ordering.

Operation 910 is an operation of registering a user at the portable terminal 200 of the example of FIG. 2.

Referring to the example of FIG. 9, operation 910 includes operations 912 through 918.

In operation 912, the method may project a near infrared ray toward the skin of a registered user. For example, the NIR ray projector 210 may project an NIR ray toward a skin of a user adjacent to the portable terminal 200 using an LED that emits an NIR ray.

In operation 914, the method may receive light reflected by the skin. For example, the light receiver 220 may receive a light reflected by the skin using an image sensor.

In operation 916, the method may generate a vein pattern of the skin. For example, the vein pattern generator 230 may generate a vein pattern of the skin based on an image generated using the received light.

In operation 918, the method may register a user by registering the vein pattern. For example, the authenticator 240 may register the user at the portable terminal 200 by storing the generated vein pattern of the user.

For example, the authenticator 240 may encrypt the vein pattern of the user and store the encrypted vein pattern in the storage 250.

Figure 10:
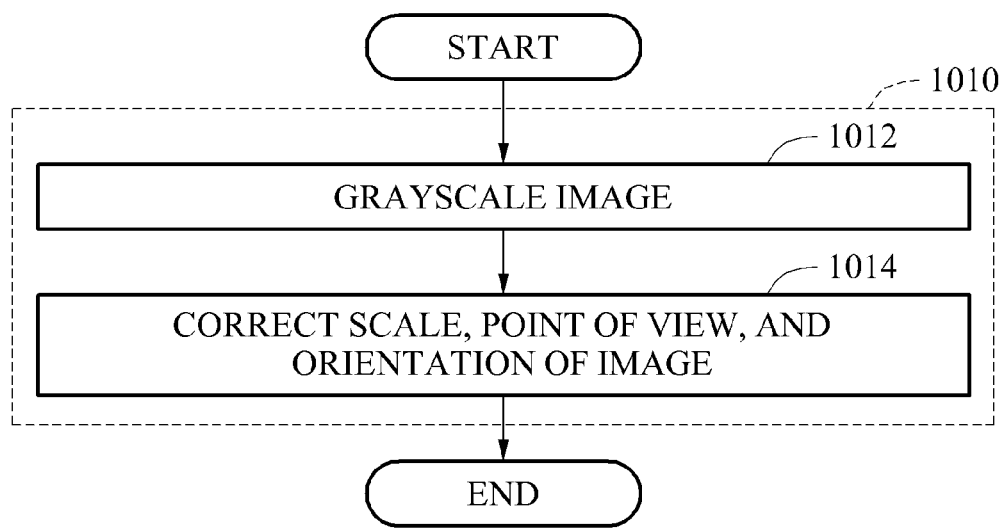
FIG. 10 is a flowchart illustrating an example of a method of correcting an image.

FIG. 10 is a flowchart illustrating an example of a method of correcting an image.

Operation 360 of FIG. 3 may optionally further include operation 1010.

In operation 1010, the authenticator 240 may correct the image obtained from the light receiver 220 and vein pattern generation 230 to verify whether the generated vein pattern matches a pre-stored vein pattern.

Referring to the example of FIG. 10, operation 1010 may include operations 1012 and 1014.

In operation 1012, the method may grayscale the image. For example, the authenticator 240 may grayscale the image.

In operation 1014, the method may correct any one or any combination of any two or more of a scale, a point of view, and an orientation of the grayscaled image. For example, the authenticator 240 may correct any one or any combination of any two or more of a scale, a point of view, and an orientation of the grayscaled image.

Figure 11:
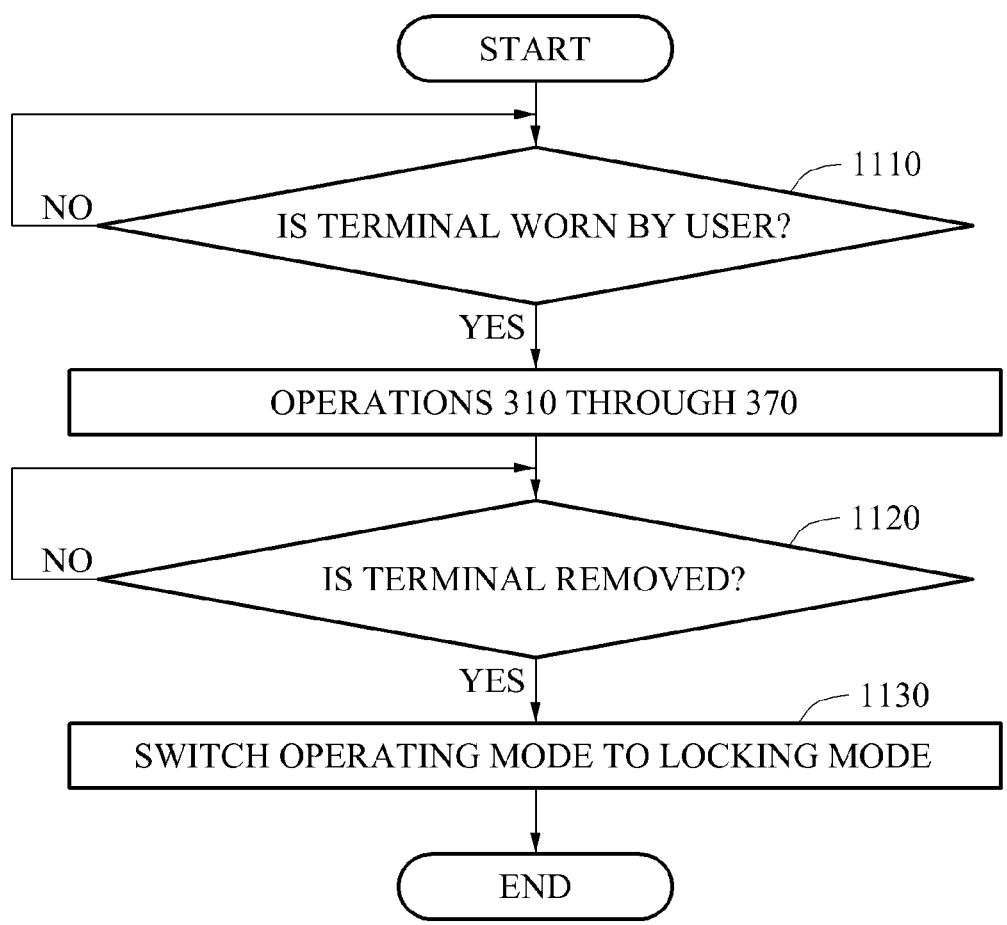
FIG. 11 is a flowchart illustrating an example of a method of switching an operating mode of a portable terminal to a locking mode.

FIG. 11 is a flowchart illustrating an example of a method of switching an operating mode of a portable terminal to a locking mode.

Referring to the example of FIG. 11, in operation 1110, the method may verify whether the portable terminal 200 is worn by the user. For example, the controller 260 may verify whether the portable terminal 200 is worn by the user. For example, one way in which the controller 260 verifies whether the portable terminal 200 is worn by the user may be by using a sensor. In an example, when the portable terminal 200 is a watch type device, the sensor may be included in a body part or a watchband of the portable terminal 200.

In another example, the controller 260 may verify whether the portable terminal 200 is worn by the user by verifying whether the portable terminal 200 is powered on.

Thus, in an example, when or in situations when the portable terminal 200 is worn by the user, operations 310 through 370 may be performed as discussed above to perform vein pattern authentication.

In the example of FIG. 11, after operation 370 is performed, operation 1120 may be subsequently performed.

In operation 1120, the method may verify whether the portable terminal 200 is removed. For example, the controller 260 verifies whether the portable terminal 200 is removed.

When the portable terminal 200 is removed, operation 1130 may be performed.

In operation 1130, the method may switch an operating mode of the portable terminal 200 to be a locking mode. For example, the controller 260 may switch an operating mode of the portable terminal 200 to a locking mode.

Figure 12:
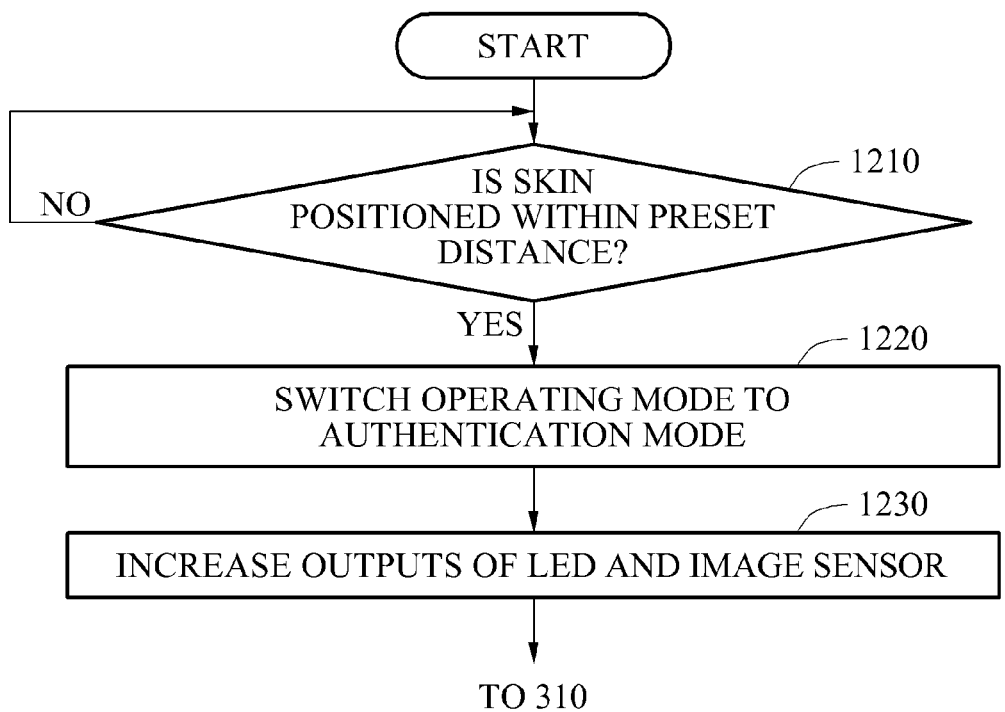
FIG. 12 is a flowchart illustrating an example of a method of switching an operating mode of a portable terminal to an authentication mode.

FIG. 12 is a flowchart illustrating an example of a method of switching an operating mode of a portable terminal to an authentication mode.

Operations 1210 through 1230 may be performed before operation 310 of FIG. 3 is performed.

Referring to the example of FIG. 12, in operation 1210, the method may verify whether the skin is positioned within a preset distance from the portable terminal 200. For example, the controller 260 may verify whether the skin is positioned within a preset distance from the portable terminal 200.

For example, the controller 260 may verify whether the skin is positioned within the preset distance from the portable terminal 200, such as by using an LED and an image sensor.

In operation 1220, the method may switch an operating mode of the portable terminal 200 to an authentication mode when the skin is positioned within the preset distance from the portable terminal 200. For example, the controller may switch an operating mode of the portable terminal 200 to an authentication mode when the skin is positioned within the preset distance from the portable terminal 200.

In operation 1230, the method may increase outputs of the LED of the NIR ray projector 210 and the image sensor of the light receiver 220 to preset outputs. For example, the controller 260 may increase outputs of the LED of the NIR ray projector 210 and the image sensor of the light receiver 220 to preset outputs.

For example, the controller 260 may increase the outputs of the LED and the image sensor used for a general user interface (UI) to outputs for the authentication mode. For example, the general UI may be set to a mode to recognize a gesture of a user.

Because the outputs of the LED and the image sensor are increased only when the operating mode is switched to the authentication mode, a battery consumption of the portable terminal 200 may be reduced.

After operation 1230 is performed, operation 310 of FIG. 3 may be subsequently performed.

Figure 13:
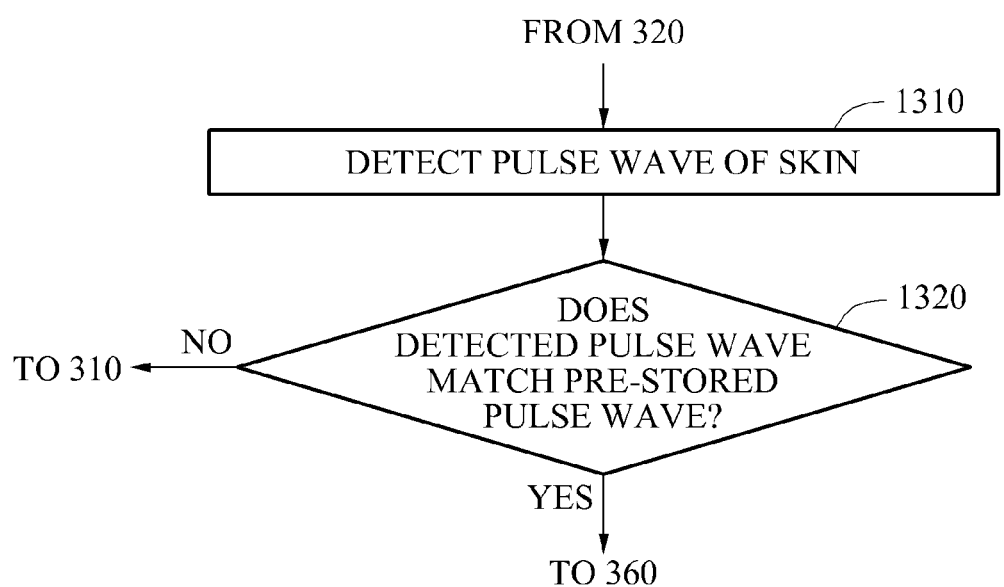
FIG. 13 is a flowchart illustrating an example of a method of detecting a pulse wave of a user.

FIG. 13 is a flowchart illustrating an example of a method of detecting a pulse wave of a user.

Operations 1310 and 1320 relate to a method of authenticating a user using a pulse wave of a vein of a skin.

Operations 1310 and 1320 may be performed after operation 320 of FIG. 3 is performed, but examples are not limited to this specific ordering.

Referring to FIG. 13, in operation 1310, the method may detect a pulse wave of a vein of a skin. For example, the authenticator 240 may detect a pulse wave of a vein of a skin.

To detect the pulse wave, a change in the vein may be sensed. For example, the authenticator 240 may use an image amplifier to sense a change in the vein. That is, the authenticator 240 may use the image amplifier to detect the pulse wave.

To detect the pulse wave, video data may be used, rather than a single image. Such video data includes a plurality of images that indicate changes over time. For example, the video data may be obtained by iteratively performing operations 310 and 320.

The authenticator 240 may detect the pulse wave of the vein of the skin using the video data. For example, the authenticator 240 may use an extraction algorithm to detect the pulse wave based on the video data.

In operation 1320, the method may verify whether the detected pulse wave matches a pre-stored pulse wave. For example, the authenticator 240 may verify whether the detected pulse wave matches a pre-stored pulse wave.

In an example, the pre-stored pulse wave is a pulse wave detected from the user, e.g., using the extraction algorithm, when the user is registered at the portable terminal 200.

When the detected pulse wave matches the pre-stored pulse wave, operation 360 of FIG. 3 is performed.

In an example, operations 1310 and 1320 may be performed in parallel with operations 340 and 350 of FIG. 3.

Figure 14:
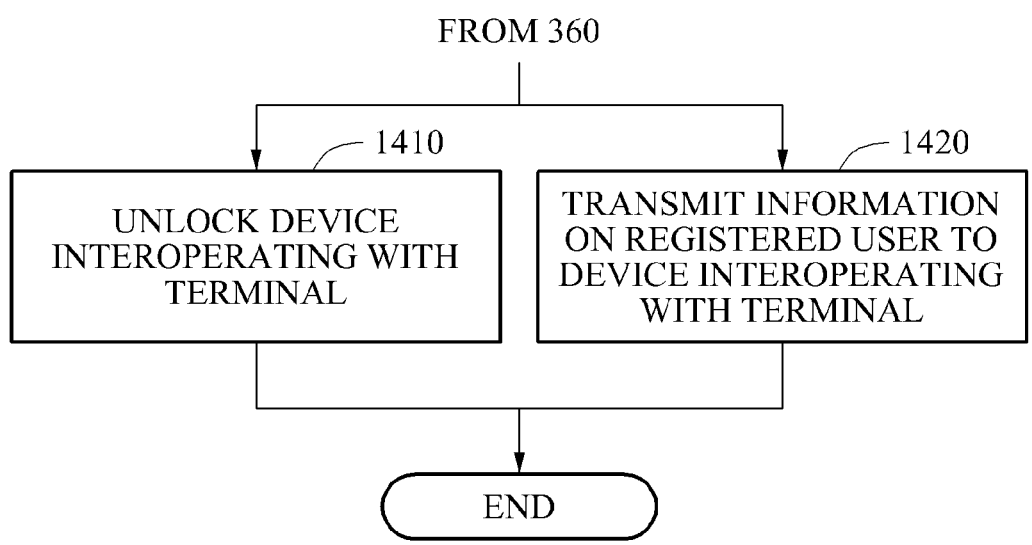
FIG. 14 is a flowchart illustrating an example of a method of unlocking a device interoperating with a portable terminal.

FIG. 14 is a flowchart illustrating an example of a method of unlocking a device interoperating with a portable terminal.

For example, operation 1410 or 1420 may be performed after operation 360 of FIG. 3 is performed, but examples are not limited to this specific ordering.

Referring to the example of FIG. 14, in operation 1410, the method may unlock a device interoperating with the portable terminal 200 when the user is authenticated as a registered user. For example, the controller 260 may unlock a device interoperating with the portable terminal 200 when the user is authenticated as a registered user. In an example, the controller 260 unlocks a smartphone interoperating with the portable terminal 200. In another example, the controller 260 unlocks an automobile interoperating with the portable terminal 200.

According to an example, when a user authentication is required to use a service, for example, financial transactions or payments, the portable terminal 200 authenticates a user and transmits authentication information to the provider of the service.

In operation 1420, the method may transmit information on the registered user to the device interoperating with the portable terminal 200 when the user is authenticated as the registered user. For example, the controller 260 may transmit information on the registered user to the device interoperating with the portable terminal 200 when the user is authenticated as the registered user.

According to an example, the device may provide customized information for the registered user based on the received information related to the registered user. For example, when the device is a television, the television may provide contents preferred by the registered user based on the information related to the registered user.

Figure 15:
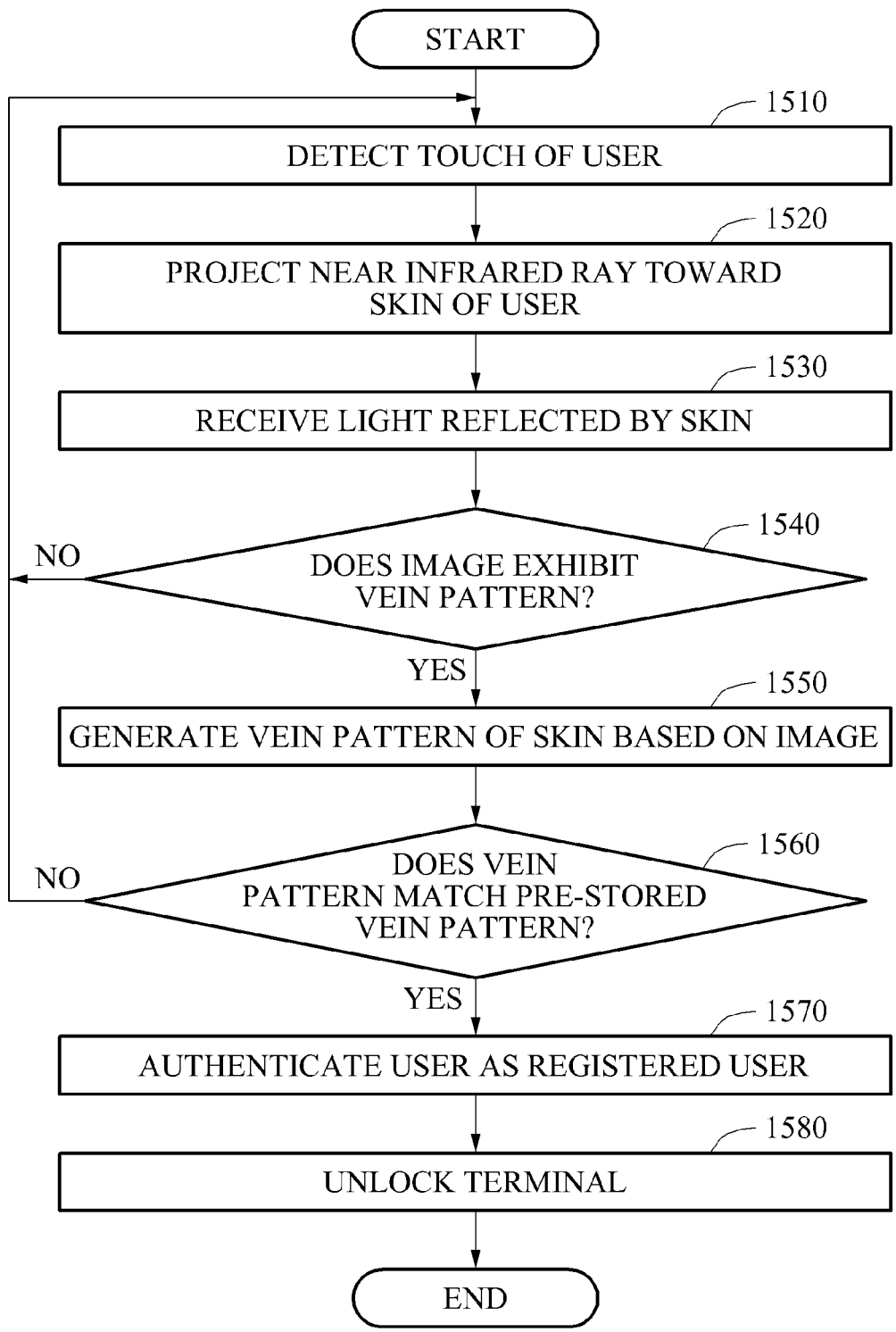
FIG. 15 is a flowchart illustrating an example of a vein pattern authentication method.

FIG. 15 is a flowchart illustrating an example of a vein pattern authentication method. For example, the vein pattern authentication method of FIG. 15 may be performed by the portable terminal 200 of FIG. 2.

Referring to the example of FIG. 15, in operation 1510, the method may detect a touch of a user with respect to the portable terminal 200. For example, the controller 260 may detect a touch of a user with respect to the portable terminal 200.

In operation 1520, the method may project an NIR ray toward a touched skin of the user using an LED. For example, the NIR ray projector 210 may project an NIR ray toward a touched skin of the user using an LED.

The descriptions of operation 310 of FIG. 3 are also applicable to operation 1520, with respect to aspects of projecting light.

In operation 1530, the method may receive a light reflected by the skin using an image sensor. For example, the light receiver 220 may receive a light reflected by the skin using an image sensor. The light receiver 220 may generate an image using the received light.

The descriptions of operation 320 of FIG. 3 are applicable to operation 1530, with respect to aspects of receiving the reflected light.

In operation 1540, the method may verify whether the image exhibits a vein pattern. For example, the vein pattern generator 230 may verify whether the image exhibits a vein pattern.

The descriptions of operation 330 of FIG. 3 are applicable to operation 1540 with respect to aspects of verifying.

In operation 1550, the method may generate a vein pattern of the skin based on the image generated using the received light. For example, vein pattern generator 230 may generate a vein pattern of the skin based on the image generated using the received light.

In operation 1560, the method may verify whether the generated vain pattern matches a pre-stored vein pattern. For example, the authenticator 240 may verify whether the generated vain pattern matches a pre-stored vein pattern.

The descriptions of operation 350 of FIG. 3 are applicable to operation 1560, with respect to aspects of considering matches.

In operation 1570, the method may authenticate the user as a registered user of the pre-stored vein pattern when the generated vein pattern matches the pre-stored vein pattern. For example, the authenticator 240 may authenticate the user as a registered user of the pre-stored vein pattern when the generated vein pattern matches the pre-stored vein pattern.

The descriptions of operation 360 of FIG. 3 are applicable to operation 1570 with respect to authentication.

In operation 1580, the method may unlock the portable terminal 200 when the user is authenticated as the registered user. For example, the controller 260 may unlock the portable terminal 200 when the user is authenticated as the registered user.

The descriptions of operation 370 of FIG. 3 are applicable to operation 1580, with respect to unlocking the portable terminal 200.

Figure 16:
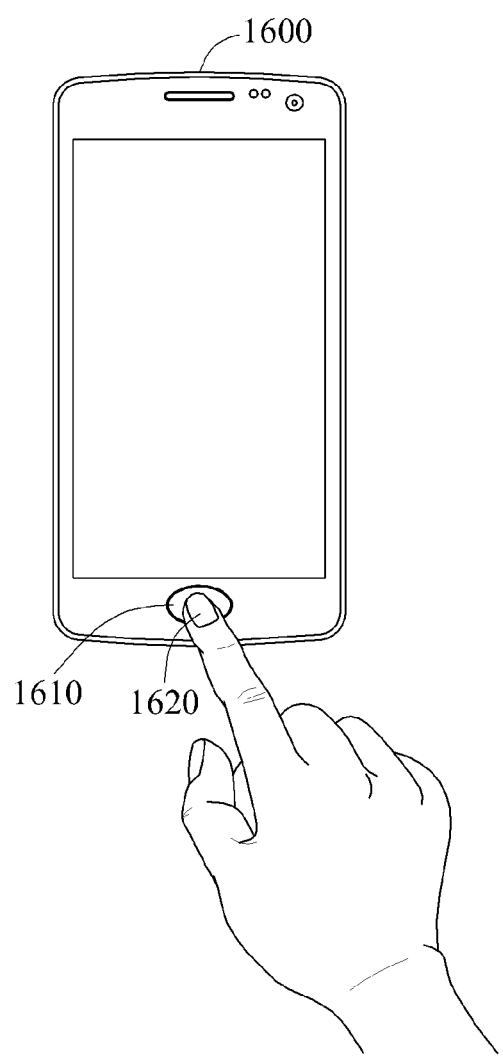
FIG. 16 illustrates an example of a portable terminal authenticating a vein pattern using a touch of a user.

FIG. 16 illustrates an example of a portable terminal 1600 authenticating a vein pattern using a touch of a user.

In the example of FIG. 16, the portable terminal 1600 corresponds to the portable terminal 200 of FIG. 2.

According to various examples, the portable terminal 1600 may be a smartphone, a laptop computer, or a tablet PC. However, these are only examples, and the portable terminal 1600 is not limited to these examples. In other examples, the portable terminal 1600 may consist of another portable electronic device.

According to another example, the portable terminal 1600 may be a wearable device. For example, in such an example, the portable terminal is a smartwatch, electronic ring, or electronic glasses.

Referring to FIG. 16, a user may attempt to initiate a vein authentication by touching a touch portion 1610 of the portable terminal 1600 with a skin 1620 of the user.

In an example, the touch portion 1610 is of a physical button type. In another example, the touch portion 1610 is a soft key. Thus, the touch portion 1610 is an area of the portable terminal 1600 that activates when touched.

The controller 260 of FIG. 2 may detect the touch of the user using the touch portion 1610.

Although the example of FIG. 16 illustrates the portable terminal 1600 as corresponding to a smartphone, including the touch portion 1610 in a wearable device may be featured in another example.

For example, the touch portion 610 may be included in a watch type wearable device. Again, the touch portion 1610, in examples, is a physical button or a soft key, or another area of the portable terminal 1600 that activates when touched.

Figure 17:
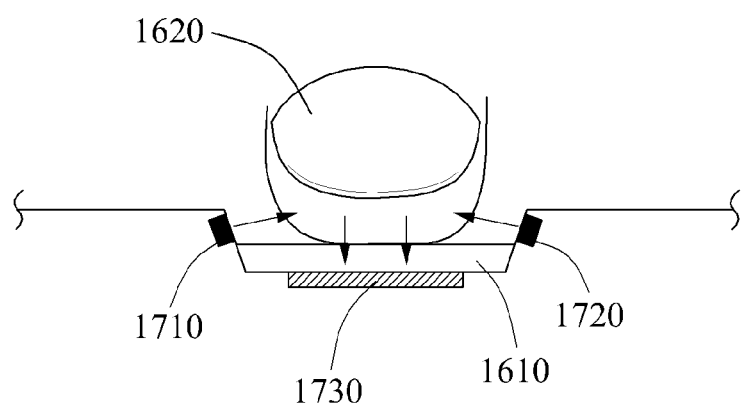
FIG. 17 illustrates an example of a method of projecting an NIR ray toward a skin of a user.

FIG. 17 illustrates an example of a method of projecting an NIR ray toward a skin.

Referring to the example of FIG. 17, the portable terminal 1600 of FIG. 16 may include NIR ray projectors 1710 and 1720, and a light receiver 1730. In the example of FIG. 17, the NIR ray projectors 1710 and 1720, and the light receiver 1730 may correspond to the NIR ray projector 210, and the light receiver 220 of FIG. 2, respectively. Descriptions of the NIR ray projectors 1710 and 1720, and the light receiver 1730 correspond to the descriptions of the NIR ray projector 210 and the light receiver 220, respectively, and hence are not repeated, for brevity.

For example, the NIR ray projectors 1710 and 1720 may include a plurality of LEDs.

In such an example, the NIR ray projectors 1710 and 1720 project NIR rays toward the skin 1620 of the user. For example, the skin 1620 of the user may be a finger of the user.

In this example, the light receiver 1730 may receive lights reflected by the finger 1620.

Although FIG. 17 illustrates the touch portion 1610 provided in a form of a flat surface, in another example the touch portion 1610 is provided in a form of a curved surface. When the touch portion 1610 is provided in a form of a curved surface, the touch portion 1610 is disposed between the finger 1610 and the NIR ray projectors 1710 and 1720.

Technical descriptions provided for each figure also pertain to subsequent figures, and hence duplicated descriptions are omitted for brevity.

The apparatuses, modules, devices, and other components illustrated in FIGS. 1-17 that perform the operations described herein with respect to FIGS. 1-17, such as portable terminal 200, near infrared ray projector 210, light receiver 220, vein pattern generator 230, authenticator 240, storage 250, controller 260, portable terminal 1600, touch portion 1610, NIR ray projectors 1710 and 1720, and light receiver 1730, as non-limiting examples, are implemented by hardware components. Examples of hardware components include controllers, sensors, generators, drivers, and any other known, in view of an understanding of the disclosure of this application, electronic components configured to perform the operations described in this application. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known after an understanding of the disclosure of this application and that is configured to respond to and execute instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described in this application. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-17 that perform the operations described herein with respect to FIGS. 1-17 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using a programming language based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device that is configured to store the instructions or software and any associated data, data files, and data structures in a non-transitory manner and provide the instructions or software and any associated data, data files, and data structures so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, a terminal/device/unit as described herein may be a mobile device, such as a cellular phone, a smartphone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smartphone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A terminal authentication method, the method comprising:
    projecting a near infrared (NIR) ray using a light emitting diode (LED) of a terminal;
    receiving a light reflected by a vein of a user using an image sensor of the terminal;
    verifying whether an image generated using the received light exhibits a vein pattern;
    in response to the image generated using the received light being verified as exhibiting the vein pattern, generating a vein pattern of the vein based on an image generated using the received light; and
    in response to the generated vein pattern being determined to match a pre-stored vein pattern, authenticating the user as a registered user corresponding to the pre-stored vein pattern.

2. The method of claim 1, wherein the terminal is a wearable device.

3. The method of claim 1, wherein the terminal is worn on a hand of the user, and the vein of the user is a vein of at least a portion of the hand of the user.

4. The method of claim 1, further comprising:
    in response to the user being authenticated as the registered user, unlocking the terminal.

5. The method of claim 1, further comprising:
    in response to an output of the LED being determined to be lower than a preset output, controlling the projecting of the NIR ray by increasing an integration time of the image sensor.

6. The method of claim 1, further comprising generating the pre-stored vein pattern in a registering of the registered user at the terminal.

7. The method of claim 6, wherein the registering comprises:
    projecting the NIR ray toward a vein of the registered user adjacent to the terminal using the LED;
    receiving a light reflected by the vein of the registered user using the image sensor;
    generating a vein pattern of the vein of the registered user based on the image generated using the received light; and
    registering the registered user at the terminal by storing the vein pattern.

8. The method of claim 1, wherein the terminal is worn on an arm of the user, and the vein of the user is a vein of at least a portion of the arm.

9. The method of claim 8, wherein the vein is a vein of at least a part of a back of a hand of the user.

10. A terminal authentication method, the method comprising:
    verifying that a vein of the user is positioned less than a preset distance from a terminal;
    in response to the verifying, switching an operating mode of the terminal to an authentication mode;
    in response to the operating mode being switched to the authentication mode, increasing a currently provided output of a light emitting diode (LED) of the terminal;
    projecting a near infrared (NIR) ray, using the LED, onto the vein;
    receiving a light reflected by the vein using an image sensor of the terminal;
    generating a vein pattern of the vein based on an image generated using the received light; and
    in response to the generated vein pattern matching a pre-stored vein pattern, authenticating the user as a registered user corresponding to the pre-stored vein pattern.

11. The method of claim 10, wherein the verifying that the vein is positioned less than the preset distance from the terminal is performed using the LED and the image sensor at the currently provided output of the LED.

12. The method of claim 10, wherein the terminal is a wearable device.

13. The method of claim 12, wherein the verifying that the vein is positioned less than the preset distance from the terminal occurs in response to a determination that a body part is within the preset distance from the terminal.

14. The method of claim 10, further comprising:
in response to the user being authenticated as the registered user, unlocking the terminal.

15. The method of claim 10, further comprising:
in response to an output of the LED being determined to be lower than a preset output, controlling the projecting of the NIR ray by increasing an integration time of the image sensor.

16. The method of claim 10, further comprising generating the pre-stored vein pattern in a registering of the registered user at the terminal.

17. The method of claim 16, wherein the registering comprises:
projecting the NIR ray toward a vein of the registered user adjacent to the terminal using the LED;
receiving a light reflected by the vein of the registered user using the image sensor;
generating a vein pattern of the vein of the registered user based on the image generated using the received light; and
registering the registered user at the terminal by storing the vein pattern.

18. A terminal authentication method, the method comprising:
verifying that a terminal is being worn by a user, wherein the terminal is a wearable device;
in response to the verifying that the terminal is being worn by the user, projecting a near infrared (NIR) ray using a light emitting diode (LED) of the terminal;
receiving a light reflected by a vein of the user using an image sensor of the terminal;
generating a vein pattern of the vein based on an image generated using the received light; and
in response to the generated vein pattern matching a pre-stored vein pattern, authenticating the user as a registered user corresponding to the pre-stored vein pattern.

19. The method of claim 18, wherein the verifying that the terminal is being worn by the user is performed using the LED and the image sensor.

20. The method of claim 19, further comprising, in response to the verifying that the terminal is being worn by the user, increasing an output of the LED.

21. The method of claim 18, further comprising:
verifying that the terminal is removed from the user; and
in response to the terminal being removed, switching an operating mode of the terminal to a locking mode.

22. A terminal comprising:
a light emitting diode (LED) of a terminal configured to project a near infrared (NIR) ray;
an image sensor of the terminal configured to receive a light reflected by a vein of the user; and
one or more processors configured to
verify whether an image generated using the received light exhibits a vein pattern,
in response to the image generated using the received light exhibiting a vein pattern, generate a vein pattern of the vein based on an image generated using the received light, and
in response to the generated vein pattern matching a pre-stored vein pattern, authenticate the user as a registered user corresponding to the pre-stored vein pattern.

23. A terminal authentication method, the method comprising:
verifying that a terminal is being worn by a user;
based on a result of the verifying being that the terminal is being worn by the user, projecting a near infrared (NIR) ray using a light emitting diode (LED) of the terminal;
sensing light information of a light reflected by a vein of the user using one or more image sensors of the terminal;
generating a vein pattern of the vein based on an image generated using the sensed light information; and
in response to the generated vein pattern matching a pre-stored vein pattern, authenticating the user as a registered user corresponding to the pre-stored vein pattern,
wherein the verifying that the terminal is being worn by the user is performed using the LED and the one or more image sensors,
wherein the terminal is worn on an arm of the user, and the vein of the user is a vein of at least a portion of the arm.

24. The method of claim 23, wherein the vein is a vein of at least a part of a back of a hand of the user.

* * * * *